United States Patent [19]

Stapp

[11] 4,455,254

[45] Jun. 19, 1984

[54] CYANOHYDROCARBYL SUBSTITUTED SULFONATES AND THEIR USE IN POST PRIMARY OIL RECOVERY

[75] Inventor: Paul R. Stapp, Bartlesville, Okla.

[73] Assignee: Phillips Petroleum Company, Bartlesville, Okla.

[21] Appl. No.: 359,000

[22] Filed: Mar. 17, 1982

[51] Int. Cl.$^3$ ............... G21B 43/22; G21B 43/24
[52] U.S. Cl. ............... 252/8.55 D; 166/273; 166/274; 166/275; 260/465 R; 260/465.1
[58] Field of Search ............... 252/8.55 D; 166/273, 166/274, 275; 260/465 R, 465.1

[56] References Cited

U.S. PATENT DOCUMENTS

| | | | |
|---|---|---|---|
| 2,830,018 | 4/1958 | Thompson et al. | 252/8.5 |
| 3,508,612 | 4/1970 | Reisberg et al. | 166/274 |
| 3,799,264 | 3/1974 | Carenas et al. | 166/275 |
| 3,811,504 | 5/1974 | Flournoy et al. | 166/273 |
| 3,811,505 | 5/1974 | Flournoy et al. | 166/274 |
| 3,811,507 | 5/1974 | Flournoy et al. | 166/274 |
| 3,827,497 | 8/1974 | Dycus et al. | 166/274 |
| 3,858,656 | 1/1975 | Flournoy et al. | 166/274 |
| 3,920,073 | 11/1975 | Holm | 166/274 |
| 3,939,911 | 2/1976 | Maddox, Jr. et al. | 166/274 |
| 3,946,812 | 3/1976 | Gale et al. | 166/274 |
| 3,977,471 | 8/1976 | Gale et al. | 166/273 |
| 4,008,768 | 2/1977 | Birk | 166/274 |
| 4,018,278 | 4/1977 | Shupe | 166/252 |
| 4,059,154 | 11/1977 | Braden, Jr. et al. | 166/274 |
| 4,076,743 | 2/1978 | Koch et al. | 260/501.13 |
| 4,077,471 | 3/1978 | Shupe et al. | 166/252 |
| 4,083,189 | 5/1978 | Shupe | 166/272 |
| 4,120,358 | 10/1978 | Kalfoglou | 166/275 |
| 4,138,345 | 2/1979 | Williams | 252/8.55 D |
| 4,154,301 | 5/1979 | Carlin et al. | 166/273 |
| 4,157,115 | 6/1979 | Kalfoglou | 166/274 |
| 4,165,785 | 8/1979 | Schievelbein | 166/274 |
| 4,193,482 | 3/1980 | Wilson et al. | 166/274 |
| 4,203,491 | 5/1980 | Reisberg | 166/274 |

*Primary Examiner*—Christine M. Nucker

[57] ABSTRACT

New cyanohydrocarbylated metal organosulfonates, their production and use in post/primary oil recovery are disclosed.

22 Claims, No Drawings

CYANOHYDROCARBYL SUBSTITUTED SULFONATES AND THEIR USE IN POST PRIMARY OIL RECOVERY

This invention relates to new chemical compounds. In another aspect, this invention relates to a new surfactant system. In still another aspect, this invention relates to post primary oil recovery employing a new surfactant system.

BACKGROUND OF THE INVENTION

Water flooding and surfactant flooding are processes well known in the art to recover the vast quantities of oil which remain in the formation after primary oil recovery operations. Designing new surfactant systems of high oil recovery efficiency and good phase stability remains a goal in this technology.

THE INVENTION

It is one object of this invention to provide a new chemical composition useful in oil recovery.

Another object of this invention is to provide a process for the production of such a new chemical composition which is inexpensive and employs readily available starting materials.

A further object of this invention is the provision of a surfactant system useful in surfactant flooding. Particularly the surfactant system should be useful in environments comprising hard brines.

Yet another object of this invention is to provide an oil recovery process using the surfactant system of this invention.

These and other objects, advantages, details, features and embodiments of this invention will become apparent to those skilled in the art from the following detailed description of the invention and the appended claims.

In accordance with this invention, a new chemical composition is provided which can be broadly characterized as a cyanohydrocarbyl substituted organic sulfonate. It has been found that such compositions are useful surfactants in post primary oil recovery.

CYANOHYDROCARBYLATION

In accordance with a first embodiment of this invention, a process to produce the cyanohydrocarbyl substituted composition of this invention is provided. This process is characterized by a reaction between one or more metal hydrocarbyl sulfonates with one or more unsaturated hydrocarbyl nitrile compounds possessing $\alpha,\beta$-olefinic unsaturation. "Metal" as used herein refers to both ammonium, alkali and alkaline earth metals. The reaction is carried out in the presence of a base and in the essential absence of water.

The metal hydrocarbyl sulfonates used in the process of this invention can be broadly characterized by the formula $$(R-CH_2-A-SO_3)_nM$$

wherein n is the valence of M, i.e., 1 or 2, A represents an aromatic, alkenylene or alkyene radical having 6 to 30 carbon atoms or a valence bond. The latter groupings arising, e.g., by interactions of a sulfonating agent such as $SO_3$ with olefinic linkages present in the sulfonatable oil feedstock. When A represents an aromatic radical, it is contemplated that in addition to the hydrocarbyl grouping $RCH_2-$ there may or may not be other similar moieties. The radical A can be derived from benzene or alkylbenzenes as well as from polynuclear aromatics such as naphthalene, anthracene, and phenanthrene and alkylated derivatives thereof. The $RCH_2-$ grouping represents an alkyl radical of 4 to 30 carbon atoms and the radical R is a hydrocarbyl radical of 3 to 30 carbon atoms, preferably can be a straight chain or branched alkyl radical. M represents ammoniun ion, and alkali metal or alkaline earth metal cations. Preferably M represents sodium because of price and availability. Among the metal hydrocarbyl sulfonates suitable as starting materials for preparing the inventive compositions, the arene sulfonates, and particularly the the petroleum sulfonates are presently preferred. Petroleum sulfonates are well known in the art and are obtained by a sulfonation of aromatic petroleum fractions followed by neutralization with ammonium hydroxide or the hydroxides of alkali metals or alkaline earth metals. These petroleum sulfonates are commercially available products. Some commercially available sulfonates, such as some petroleum sulfonates, contain, e.g. alkali metal hydroxide. Such sulfonates after removal of water by, e.g. azeotropic distillation can be cyanohydrocarbylated without further or additional base catalyst having to be added. The presently preferred sodium petroleum sulfonates used in preparing the cyanohydrocarbylated surfactants of this invention have an average equivalent weight in the range of 325 to 500. Best enhanced oil recovery results with presently known reservoirs are believed to be obtainable from said sodium petroleum sulfonate derivatives.

The unsaturated hydrocarbyl nitrile used in this invention can be generally characterized as a nitrile having an $\alpha,\beta$-olefinic unsaturation relative to the cyano group. The unsaturated nitriles used in the process of this invention can be broadly described by the formula

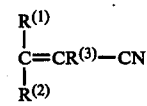

wherein $R^{(1)}$, $R^{(2)}$ and $R^{(3)}$ are hydrogen, aryl or alkaryl radicals with 6 to 10 carbon atoms, or an alkyl radical of 1 to 5 carbon atoms. These radicals can be the same or different.

The cyanohydrocarbylation is carried out in accordance with this invention in the presence of a base. This base can be any of the strong bases known to catalyze the substitution reaction here involved. The base is preferably selected from the group consisting of the alkali metal hydroxides and tertiary amines. Most preferably, the reaction is carried out in the presence of sodium hydroxide and/or potassium hydroxide. Other bases well known in the art can also be used such as tertiary amines including triethylamine, pyridine, quinoline and the like.

Suitable solvents include hydrocarbons, preferably aromatic hydrocarbons, ethers, esters and halogenated hydrocarbons such as benzene, toluene, xylene, pentane, heptane, tetrahydrofuran, dioxane, methylene chloride, carbon tetrachloride, ethyl acetate, butyl acetate, and 1,2-dimethoxyethane. The ingredients involved in the process of this invention are employed in ranges that are not overly critical but generally within the following limits

|  | mole sulfonate / mole nitrile | |
| --- | --- | --- |
|  | Broad | Preferred |
| Molar ratio Organic sulfonate:unsaturated hydrocarbyl nitrile | 10:1 to 1:10 | 2:1 to 1:2 |

The base is present in a 0.1 to 20 mol. % level based on the limiting reagent.

The cyanohydrocarbylation reaction is carried out under conditions which are also not critical. The conditions of temperature and pressure generally are such that the reagents involved remain in the liquid phase. As a general rule the temperature will be in the range of 0° to 100° C. and the pressure will be sufficient to maintain the reactant mass in essentially a liquid state. The reaction duration will be depend primarily upon economic considerations. Typical reaction times are in the range of several minutes to 24 hours.

While it is possible to employ the reaction product without any further separation in certain applications, it is possible to remove the base catalyst from the reaction mixture. This removal of the base catalyst can be achieved by acidification to a pH of about 7 with an organic acid such as acetic acid. If desired, the cyanohydrocarbylated sulfonate can also be separated from the unreacted nitrile and sulfonate. This separation can be done by standard techniques including distillation to remove volatiles such as solvent and unreacted nitrile followed by liquid-liquid extraction.

CYANOHYDROCARBYLATED ORGANO SULFONATE

In accordance with a second embodiment of this invention a new chemical composition is provided. This new chemical composition can broadly be characterized as a cyanohydrocarbylated organo sulfonate. These novel compounds are presently believed to be described by the general formula

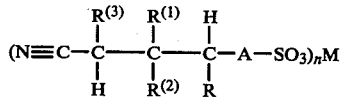

wherein A, M, R and $R^{(1)}$, $R^{(2)}$ and $R^{(3)}$ have the same meaning as defined above. Since the above formula has not yet been confirmed unequivocally, the new compounds of this invention are also characterized as being obtained by the cyanohydrocarbylation reaction characterized above.

The novel compositions of this invention include mixtures of two or more of cyanohydrocarbylated organo sulfonates as characterized. The presently preferred composition is one that has been obtained by a cyanohydrocarbylation reaction of petroleum sulfonate. These compositions can best be characterized as a mixture of cyanohydrocarbylated compounds as defined and having an average equivalent weight in the range of about 370 to 650. The preferred equivalent weight range for these novel compounds is about 370 to 550.

SURFACTANT SYSTEM

In accordance with a third embodiment of this invention, a surfactant system effective for enhanced oil recovery is provided. This system is an aqueous saline surfactant mixture comprising the novel cyanohydrocarbyl-substituted sulfonate and optionally a protective agent. Generally, a brine which contains a certain quantity of sodium chloride is used in the surfactant system. Suitable compositions of inventive surfactant systems are shown in the following table.

TABLE I

| Ingredient (parts by weight) | Broad Range | Preferred Range |
| --- | --- | --- |
| Water | 100 | 100 |
| Cyanohydrocarbyl Substituted Hydrocarbyl Sulfonate* | 1–12 | 2–5 |
| Protective Agent** | 0.01–3 | 0.05–2 |
| NaCl | 0.1–10 | 0.1–8 |

*The ranges for the active hydrocarbon sulfonate (e.g. petroleum sulfonate) in parts by weight. The "active" value is readily determined by multiplying parts by weight used and the percentage of active ingredients in the product.
**Suitable protective agents include, e.g., polyalkoxylated phenols and alcohols

COSURFACTANTS

In accordance with this invention it is not necessary to employ a cosurfactant. However, under certain conditions and in particular environments during post primary oil recovery, it may be desirable to employ the novel cyanohydrocarbylated organo sulfonates not only together with conventional hydrocarbyl sulfonates but also together with a cosurfactant. Such a cosurfactant is preferably one that is selected from the group consisting of organonitriles and alcohols. The nitriles can be broadly characterized as organonitriles having 1 to 3 —CN groups attached to carbon atoms in compounds containing up to 13 carbon atoms and up to 4 oxygen and/or sulfur atoms and up to 4 additional nitrogen atoms. The preferred nitriles are acetonitrile, propionitrile, butyronitrile, α-methylene glutaronitrile, tridecanenitrile, benzonitrile, phenylacetonitrile, acrylonitrile, methacrylonitrile, vinylacetonitrile, succinonitrile, 1,3-dicyanopropene, 1,3-dicyano-3-butene, tris(cyanoethyl)methane, 1,1-dicyanoethane and mixtures thereof. The preferred nitrile when used in addition to the novel compositions of this invention is acrylonitrile. The alcohols contemplated as cosurfactants in accordance with this invention include alcohols having 3 to 12 carbon atoms. Examples of useful alcohols which can be employed as cosurfactants include isopropanol, 1-butanol, isopentyl alcohol, isobutyl alcohol, hexanol, octanol, dodecanol, heptanol, decanol and mixtures thereof. The preferred alcohol cosurfactant is isobutyl alcohol.

When employed, the cosurfactant is used in a quantity relative to the sulfonate surfactant within the following ranges:

TABLE II

|  | Broad Range | Preferred Range |
| --- | --- | --- |
| Hydrocarbon sulfonate* | 1–12 | 2–5 |
| Cosurfactant | 0–15 | 0–15 |

*Quantities are shown in wt. %.

OIL RECOVERY PROCESS

A further embodiment of this invention resides in an oil recovery process. This process involves generally the conventional steps of post primary oil recovery and distinguishes over the known procedures primarily in the use of the novel compounds defined above and in the surfactant system employing these novel compounds.

PREFLUSH

It is optional, although not necessary, to carry out a preflush step preceding the further oil recovery operation. Such preflush operations are known in the art. Generally, a brine compatible with the surfactant system is injected via at least one injection well into the subterranean formation. Such a brine typically contains 2000–50,000 ppm salts, predominantly sodium chloride. Preferably a brine solution as utilized in the production of the surfactant system is also used in this preflush step.

The quantity of the preflush employed will generally be in a range of about 0.01 to 2, preferably 0.25 to 1 pore volume, based on the total pore volume of the formation or reservoir subjected to the recovery.

SURFACTANT FLOODING

After the optional preflush step the surfactant fluid of this invention is injected into the reservoir via at least one injection well. The surfactant system is injected in an amount usually in the range of about 0.001 to 1.0, preferably 0.01 to 0.25 pore volume based again on the pore volume of the total treated and produced formation.

The preferred operation makes use of the surfactant system in the form of a multiphase system including at least one microemulsion phase. Usually the surfactant system contains as the main ingredients water, the surfactant including the cyanohydrocarbylated organo sulfonate and optionally the cosurfactant. These ingredients are thoroughly mixed and then introduced into the formation via one or more injection wells. However, the in-situ formation of a microemulsion in the formation, e.g. by simultaneous but unmixed injection or by alternating the injection of surfactant and cosurfactant is also within the scope of this invention.

Generally, the microemulsion is formed in the reservoir after the surfactant system is injected as a solution containing surfactant and cosurfactant in brine.

The present invention can be utilized for a variety of subterranean reservoirs. The invention is, however, particularly preferred in reservoirs containing hard brine connate water. Such hard brines are characterized by a high content of Mg++ and Ca++ ions in the reservoir water. Typical hard brines contain more than 100 ppm of Ca++ and/or Mg++.

Protective agents are especially preferred ingredients in the surfactant system of this invention when used for oil recovery from reservoirs with hard brines. Examples for such protecting agents are polyethoxylated fatty alcohols and polyethoxylated alkylphenols. In addition, the sodium salts of sulfated polyethoxylated fatty alcohols and polyethoxylated alkylphenols are known in the art to function as protective agents.

MOBILITY BUFFER

Following the surfactant slug it is presently preferred, although again not necessary to inject a mobility buffer solution into the reservoir. This buffer helps prevent fingering and enhances the efficiency of the oil recovery. Buffer solutions are aqueous solutions of polymers or thickening agents. Examples of useful mobility buffers are aqueous fluids containing mobility reducing agents such as high molecular weight partially hydrolyzed polyacrylamides, polysaccharides, soluble cellulose ethers and the like. The mobility buffer comprises 50 to 20,000, preferably 200 to 5,000 ppm of the mobility reducing agent in the fluid.

The injection of the mobility buffer fluid can be at a constant composition or the mobility buffer can be graded, i.e. the injection starts out at a relatively high concentration at the leading edge and the concentration tapers off toward the trailing edge. As an example the mobility buffer can start with a concentration of 2500 ppm of polyacrylamide in the water and end with 250 ppm of polyacrylamide in water. These mobility buffer fluids are well known in the art.

The invention will be still more fully understood from the following detailed examples which are intended for illustrative purposes only and not for an undue limitation of the scope of this invention.

EXAMPLE I

This example illustrates the cyanoethylation of petroleum sulfonate.

A charge of 100 g (62 g active petroleum sulfonate, 0.148 mol based on average equivalent weight of 420) of Witco TRS 10-410, 400 mL toluene, 5 pellets of 85 weight percent KOH and a small amount of tetrahydrofuran to aid solution was placed in a reaction vessel and stirred at ambient conditions for 48 hours. The reaction mixture was stripped of volatiles on a rotary evaporator and the residue was dissolved in 400 mL of tetrahydrofuran. After the dropwise addition of 10.6 g (13.2 mL, 0.2 mol) of acrylonitrile over a period of 10 minutes to the stirred mixture, the stirred reaction mass was refluxed for a period of 8 hours. The reaction mixture was stripped of volatiles on a rotary evaporator to give a residue of 107.8 g. An elemental analysis on this residue gave the following results:

| % C | 71.58 |
| --- | --- |
| % H | 10.29 |
| % N | 1.95 |
| % S | 4.68 |
| % O | 3.23 |
| % Na | 3.30 |

An elemental analysis of Witco Chemical's TRS 10-410 gave the following results:

| % C | 69.36 |
| --- | --- |
| % H | 10.48 |
| % N | <0.1 |
| % S | 5.12 |
| % O | 10.60 |
| % Na | 4.04 |

Equivalent weight determination on the cyanoethylated material and on the TRS 10-410 material were carried out by hyamine titrations. The inventive cyanoethylated petroleum sulfonate exhibited an equivalent weight of about 477 whereas TRS 10-410 exhibited an equivalent weight of about 427. These data are consistent with the formation of a 1:1 molar adduct of acrylonitrile (formula wt. 53) and petroleum sulfonate (approximate equivalent weight 427).

EXAMPLE II

This example describes the cyanoethylation of sodium p-dodecylbenzenesulfonate.

A charge of 17.4 g (0.05 mol) sodium p-dodecylbenzenesulfonate, 200 mL tetrahydrofuran, and 5 mL (4.0 g, 0.075 mol) of acrylonitrile was placed in a reaction vessel and stirred at ambient conditions for 14 hours. Four pellets of 85 wt. percent KOH were added and the stirred reaction mixture was refluxed for 8 hours. The reaction mixture was stripped of volatiles on a rotary evaporator to give a residue of 22.9 g. An elemental analysis on this residue gave the following results:

|     |       |
| --- | ----- |
| % C | 59.78 |
| % H | 7.73  |
| % S | 7.44  |
| % N | 4.50  |

By hyamine titration, the inventive cyanoethylated material exhibited an equivalent weight of about 493. The calculated equivalent weight is about 401 for a 1:1 molar adduct of acrylonitrile and sodium p-dodecylbenzenesulfonate.

EXAMPLE III

This example illustrates the preferred method for the cyanoethylation of petroleum sulfonates.

A charge of 200 g (124 g active petroleum sulfonate) Witco TRS 10-410 petroleum sulfonate, 500 mL toluene, and ten pellets of 85 wt. percent KOH was placed in a 1-liter round-bottomed flask equipped with a magnetic stirring device, Dean-Stark water separator trap and water-cooled reflux condenser. The stirred mixture was refluxed for 3 hours and approximately 9.5 mL of water was collected in the Dean-Stark trap.

After cooling the reaction mass to room temperature, 21.2 g (26.4 mL, 0.4 mol) of acrylonitrile was added dropwise to the stirred mixture over a period of 30 minutes. The reaction mixture was boiled about 14 hours under total reflux before being stripped of volatiles on a rotary evaporator to yield 210.6 g of an orange-brown colored residue. An elemental analysis of this residue gave the following results:

|      |       |
| ---- | ----- |
| % C  | 70.80 |
| % H  | 10.25 |
| % N  | 1.72  |
| % S  | 4.52  |
| % O  | 4.31  |
| % Na | 3.91  |

By hyamine titration, the inventive cyanoethylated TRS 10-410 material exhibited an equivalent weight of about 450.

EXAMPLE IV

The following experimental procedure was used to condition sandstone cores for surfactant flood runs to demonstrate the effectiveness of the cyanoethylated petroleum sulfonate material in tertiary oil recovery.

Berea sandstone cores measuring approximately 3 feet in length and 3 inches in diameter were dried under vacuum for 24 hours at 250 F. Polycarbonate disc end plates with centrally located ⅛" threaded openings were secured to each end of the core with epoxy adhesive before applying an epoxy/gauze coating to the outside surface of the core. One-eighth inch connector fittings were placed on each end of the core and pipe plug caps were put on the core.

The core was weighed to determine the dry weight before being saturated with brine of the desired concentration. A vacuum of about 1 mm was pulled on the core before saturating the core with approximately 500 mL of brine. After saturation, approximately 100 to 200 mL of brine were pumped through the core before determining the original permeability to water. A 1 mL portion of effluent brine was collected from the saturated core and thereafter during a period of one minute, the volume of additional effluent collected and the pressure in psi were recorded. With these values the original permeability to water, e.g., on the order of 3.2 mL/min at 43 psi could be recorded. The pore volume of the core was calculated by the relationship:

$$\frac{\text{Brine-Saturated Core Wt (g)} - \text{Dry Core Wt (g)}}{\text{Brine Density (g/mL)}} = \text{Core Pore Volume (mL)}$$

The brine-saturated core was oil flooded in the conventional manner until oil break-through became detectable by the presence of alternate globules of oil and water in the effluent line. The oil flood was carried out to completion by the 24 hour recycling of oil through the core to remove all of the displaceable water. The total water displaced, i.e., water displaced at the point of oil break-through and water displaced by the 24 hour recycle procedure was recorded as water displaced by oil flood. If desired, oil permeability was determined in a manner analogous to that used above for establishing original permeability to water. Prior to waterflood, the effluent line was air blown to remove oil.

The oil-flooded core was waterflooded in the conventional manner until water break-through became detectable by the presence of alternate globules of oil and water in the effluent line. The water-flood was carried to completion by the 24 hour recycling of water through the core to remove all of the displaceable oil. The total oil displaced, i.e., oil displaced at the point of water break-through and oil displaced by the 24 hour recycle procedure was recorded as oil displaced by waterflood. If desired, water permeability after waterflood can be determined in a manner analogous to that used above for original permeability to water. The residual oil volume remaining in the core was calculated by subtracting the oil volume displaced by the waterflood from the water volume displaced by the oilflood. At this point, the core simulated an oil reservoir which had been exhaustively waterflooded. Cores were routinely conditioned in this manner prior to carrying out surfactant flood tests.

The following runs show the effectiveness of the inventive composition in tertiary oil recovery.

Surfactant flooding of waterwet Berea sandstone cores was carried out in the conventional manner, i.e., sequential injection of surfactant slug, mobility buffer and drive water: Representative results with the cyanoethylated petroleum sulfonate are summarized in Table I. Preparation of the cyanoethylated petroleum sulfonate is described in Example III.

TABLE III

| Run No.  | Salinity Wt. % NaCl (% PV Surfactant Slug) | Added Cosurfactant | % Tertiary Oil Recovery |
| -------- | ------------------------------------------ | ------------------ | ----------------------- |
| 1(Inv.)  | 1.7 (1.5)                                  | IBA*               | 63.5                    |
| 2(Inv.)  | 1.7 (3.6)                                  | IBA*               | 87.7                    |
| 3(Inv.)  | 1.7 (5.0)                                  | IBA*               | 103                     |
| 4(Inv.)  | 2.5 (3.0)                                  | None               | 75.1                    |

*IBA represents isobutyl alcohol cosurfactant (3 wt. % of the total surfactant system).

Runs 1, 2 and 3 in Table III show that the cyanoethylated petroleum sulfonate material with added isobutyl alcohol cosurfactant is effective for tertiary oil recovery. Run 4 at a somewhat higher salinity (2.5 wt.% NaCl) and without added isobutyl alcohol illustrates the effectiveness of the inventive surfactant system for tertiary oil recovery in the absence of a cosurfactant.

EXAMPLE V

This example shows the effectiveness of the inventive cyanoethylated petroleum sulfonate at 7.5% PV in the presence or absence of added isobutyl alcohol cosurfactant. The runs were carried out in the conventional manner and the results are summarized in Table IV. Preparation of the cyanoethylated petroleum sulfonate is described in Example I.

TABLE IV

| Run No. | Salinity Wt. % NaCl (% PV Surfactant Slug) | Added Cosurfactant | % Tertiary Oil Recovery |
|---|---|---|---|
| 5(Inv.) | 1.7 (7.5) | IBA* | 100 |
| 6(Inv.) | 2.5 (7.5) | None | 88.5 |
| 7(Comp)** | 2.2 (7.5) | Acrylonitrile | 76 |

*IBA represents isobutyl alcohol cosurfactant (3 wt. % of the surfactant system).
**Witco TRS 10-410 was used as the surfactant.

Runs in Table IV shows that the inventive system gives very good tertiary oil recovery, i.e., 88.5%, even with no added cosurfactant. Run 7 in Table IV is a comparative run using acrylonitrile as a cosurfactant together with petroleum sulfonate; this run thus uses the starting materials from which the inventive compound is made. A comparison of the %TOR in runs 6 and 7 indicate that the reaction product of petroleum sulfonate and acrylonitrile (run 6) is more efficient for oil recovery (88.5% TOR) than the physical blend of petroleum sulfonate and acrylonitrile (run 7; 76% TOR).

Reasonable variations and modifications which will become apparent to those skilled in the art can be made in this invention without departing from the spirit and scope thereof.

I claim:

1. Process to produce a cyanohydrocarbylated organo sulfonate comprising reacting one or more hydrocarbyl sulfonates having the formula $$(R-CH_2-A-SO_3)_nM$$

wherein R is a hydrocarbyl radical having 3–30 carbon atoms, A is an aromatic, alkenylene or alkylene radical having 6 to 30 carbon atoms, n is the valence of M, M is selected from the group consisting of ammonium, alkali and alkaline earth metals, with one or more unsaturated hydrocarbyl nitrile compounds having the formula

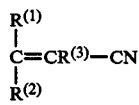

wherein $R^{(1)}$, $R^{(2)}$ and $R^{(3)}$ are hydrogen, aryl or alkaryl radicals with 6 to 10 carbon atoms or alkyl radicals with 1 to 5 carbon atoms, and wherein these radicals can be the same or different, to produce a cyanohydrocarbylated sulfonate product in the presence of a base and in the essential absence of water.

2. Process in accordance with claim 1 wherein said hydrocarbyl sulfonates are petroleum sulfonates wherein said unsaturated hydrocarbyl nitrile compound is an $\alpha,\beta$-unsaturated alkenyl nitrile, said alkenyl group having 2 to 5 carbon atoms, wherein said base is selected from the group consisting of alkali metal hydroxides and tertiary amines.

3. Process in accordance with claim 1 wherein said nitrile and said sulfonate are reacted in quantities to result in an adduct containing on the average 0.5 to 2 cyano groups per sulfonate group.

4. Process in accordance with claim 1 wherein said nitrile is acrylonitrile and said sulfonate is petroleum sulfonate.

5. Process in accordance with claim 1 wherein said reaction is carried out in the presence of a solvent.

6. Process in accordance with claim 5 wherein said solvent is selected from the group consisting of benzene, toluene, xylene, pentane, heptane, tetrahydrofuran, dioxane, methylene chloride, carbon tetrachloride, ethyl acetate, butyl acetate, and 1,2-dimethoxyethane.

7. Cyanohydrocarbylated hydrocarbyl sulfonate produced in accordance with the process of one of the claims 1 to 6.

8. Cyanohydrocarbylated hydrocarbyl sulfonate having the formula

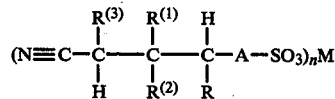

wherein A represents substituted or unsubstituted aromatic alkenylene or alkylene hydrocarbyl radical having 6 to 30 carbon atoms or a valence bond, if A is an aromatic radical the sulfonate group being attached to the aromatic portion of this radical, n is the valence of M, $R^{(1)}$, $R^{(2)}$ and $R^{(3)}$ are hydrogen, aryl or alkaryl radicals with 6 to 10 carbon atoms, or an alkyl radical of 1 to 5 carbon atoms, M stands for ammonium radical, alkali metal or alkaline earth metal atoms, and R stands for a hydrocarbyl radical having 3 to 30 carbon atoms.

9. Surfactant composition comprising water and a compound produced in accordance with the process of one of the claims 1 to 6.

10. Surfactant composition comprising water and a cyanohydrocarbylated hydrocarbyl sulfonate having the formula

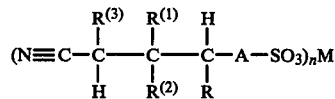

wherein A represents substituted or unsubstituted aromatic alkenylene to alkylene hydrocarbyl radical having 6 to 30 carbon atoms or a valence bond, if A is an aromatic radical the sulfonate group being attached to the aromatic portion of this radical, n is the valence of M, $R^{(1)}$, $R^{(2)}$ and $R^{(3)}$ are hydrogen, aryl or alkaryl radicals with 6 to 10 carbon atoms, or an alkyl radical of 1 to 5 carbon atoms, M stands for ammonium radical, alkali metal or alkaline earth metal atom, and R stands for a hydrocarbyl radical having 3 to 30 carbon atoms.

11. Surfactant composition in accordance with claim 9 further comprising a cosurfactant and a protective agent.

12. Surfactant system in accordance with claim 10 further comprising a cosurfactant and a protective agent.

13. Process for hydrocarbon recovery from subterranean formation comprising
(a) injecting a cyanohydrocarbylated hydrocarbon sulfonate obtained in accordance with a process of one of the claims 1 to 6 into said formation via at least one injection well,
(b) causing the so injected surfactant system to move from the injection well towards one or more production wells displacing hydrocarbon present in said formation,
(c) recovering displaced hydrocarbon from at least one of said production wells.

14. Process for hydrocarbon recovery from subterranean formation comprising
(a) injecting a surfactant comprising a cyanoalkylated hydrocarbon sulfonate having the formula

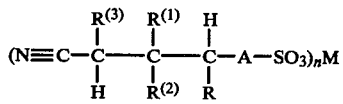

into said formation via at least one injection well, wherein A represents substituted or unsubstituted aromatic alkenylene or alkylene hydrocarbyl radical having 6 to 30 C-atoms or a valence bond, if A is an aromatic radical the sulfonate group being attached to the aromatic portion of this radical, n is the valence of M, $R^{(1)}$, $R^{(2)}$ and $R^{(3)}$ are hydrogen, aryl or alkaryl radicals with 6 to 10 carbon atoms, or an alkyl radical of 1 to 5 carbon atoms, M stands for ammonium radical, alkali metal or alkaline earth metal atom, and R stands for a hydrocarbyl radical having 3 to 30 carbon atoms, (b) causing the so injected surfactant system to move from the injection well towards one or more production wells displacing hydrocarbon present in said formation,
(c) recovering displaced hydrocarbon from at least one of said production wells.

15. A process in accordance with claim 13 wherein a mobility buffer fluid is injected into said subterranean formation following said surfactant system.

16. A process in accordance with claim 14 wherein a mobility buffer fluid is injected into said subterranean formation following said surfactant system.

17. A process in accordance with claim 15 wherein an aqueous drive fluid injected into said subterranean formation following said mobility buffer fluid.

18. A process in accordance with claim 14 wherein an aqueous drive fluid is injected into said subterranean formation following said mobility buffer fluid.

19. A process in accordance with claim 14 wherein said surfactant system further comprises a protective agent and a cosurfactant and is injected into a subterranean formation containing hard brine.

20. A process in accordance with claim 15 wherein said surfactant system further comprises a protective agent and a cosurfactant and is injected into a subterranean formation containing hard brine.

21. A process in accordance with claim 14 wherein said surfactant system comprises a cyanoethylated petroleum sulfonate obtained by reacting a petroleum sulfonate with acrylonitrile in the presence of a base.

22. A process in accordance with claim 20 wherein said surfactant system comprises a cyanoethylated petroleum sulfonate obtained by reacting a petroleum sulfonate with acrylonitrile in the presence of a base.

* * * * *